United States Patent [19]
Dixon et al.

[11] Patent Number: 5,291,516
[45] Date of Patent: Mar. 1, 1994

[54] DUAL MODE TRANSMITTER AND RECEIVER

[75] Inventors: Robert C. Dixon, Palmer Lake; Jeffrey S. Vanderpool, Colorado Springs, both of Colo.

[73] Assignee: Omnipoint Data Company, Inc., Colorado Springs, Colo.

[21] Appl. No.: 948,293

[22] Filed: Sep. 18, 1992

Related U.S. Application Data

[63] Continuation of Ser. No. 698,694, May 13, 1991, abandoned.

[51] Int. Cl.⁵ .......................... H04K 1/00; H04L 9/00
[52] U.S. Cl. ........................................................ 375/1
[58] Field of Search ............................................. 375/1

[56] References Cited

U.S. PATENT DOCUMENTS

| Re. 27,738 | 8/1973 | Honma et al. |
|---|---|---|
| 3,934,203 | 1/1976 | Schiff. |
| 3,978,436 | 8/1976 | Alig et al. |
| 4,021,898 | 5/1977 | Willis et al. |
| 4,051,448 | 9/1977 | Coussot. |
| 4,100,498 | 7/1978 | Alsup et al. |
| 4,131,484 | 12/1978 | Caruso et al. |
| 4,163,944 | 8/1979 | Chambers et al. |

(List continued on next page.)

OTHER PUBLICATIONS

Kavehrad, M. and McLane, P. J., *Spread Spectrum for Indoor Digital Radio*, IEEE Communications Magazine, Jun. 1987, vol. 25, No. 5 pp. 32-40.
Dixon, Robert C. *Spread Spectrum Systems*, John Wiley & Sons, Inc. 1984; pp. 84-86, 206.
Dixon, Robert C., *Spread Spectrum System, pp. 230-232.*
Eschenbach, Ralph, *Applications of Spread Spectrum Radio to Indoor Data Communications*, Hewlett-Packard Laboratories, IEEE 1982, pp. 34.5-1-34.5-3.
Kavehrad, Mohsen, *Direct Sequence Spread Spectrum with DPSK Modulation and Diversity for Indoor Wireless Communications*, IEEE Transactions on Communications, vol. COM-35, No. 2, Feb. 1987.
Freret, Payne et al., *applications of Spread-Spectrum Radio to Wireless Terminal Communications*, Hewlett-Packard Laboratories, IEEE 1980, pp. 69.7.1-69.7.4.
Freret, Payne *Wireless Terminal Communications Using Spread-Spectrum Radio*, Hewlett-Packard Laboratories, IEEE 1980, pp. 244-247.
Kavehrad, M. and McLane, P. J., *Performance of Low--Complexity Channel Coding and Diversity for Spread Spectrum in Indoor, Wireless Communication*, AT&T Technical Journal, vol. 64, No. 8, Oct. 1985, U.S.A.

*Primary Examiner*—Salvatore Cangialosi
*Attorney, Agent, or Firm*—Lyon & Lyon

[57] ABSTRACT

A dual-mode transmitter having an antenna, a mode controller, a source encoder, a tunable-frequency synthesizer, a chip-code generator, a spread-spectrum modulator, a narrowband modualator, a power amplifier, and an adjustable bandpass filter. Also provided is a dual-mode receiver having a mode controller, a tunable-frequency synthesizer, a chip-code generator, an antenna, an adjustable bandpass filter, a preamplifier, a frequency converter, an IF amplifier, a spread-spectrum despreader, a spread-spectrum demodulator, a narrowband modulator, and a source decoder. For the transmitter and receiver, the mode controller selects receiving a narrowband modulation or a spread-spectrum modulation. The tunable-frequency synthesizer generates a local oscillator signal for the receiver, and a carrier signal for the transmitter. The chip-code generator generates a chip code signal for both the transmitter and the receiver. With a narrowband modulation setting of the mode controller, the transmitter and receiver have the adjustable bandpass filters adjusted to a narrowband width for telephone communications. With a spread-spectrum setting of the mode controller, the adjustable bandpass filters and the system are adjusted to transmit and receive a wide bandwidth for passing the spread-spectrum signal.

8 Claims, 2 Drawing Sheets

U.S. PATENT DOCUMENTS

| | | | |
|---|---|---|---|
| 4,189,677 | 2/1980 | Cooper et al. | 375/1 |
| 4,217,563 | 8/1980 | Vale . | |
| 4,222,115 | 9/1980 | Cooper et al. | 375/1 |
| 4,247,942 | 1/1981 | Hauer | 375/75 |
| 4,285,060 | 8/1981 | Cobb et al. | 375/1 |
| 4,314,393 | 2/1982 | Wakatsuki et al. . | |
| 4,355,411 | 10/1982 | Reudink et al. | 455/33 |
| 4,418,393 | 11/1983 | Zscheile, Jr. | 375/1 |
| 4,418,425 | 11/1983 | Fennel, Jr. et al. | 455/27 |
| 4,425,642 | 1/1984 | Moses et al. | 370/76 |
| 4,425,661 | 1/1984 | Moses et al. | 375/1 |
| 4,432,089 | 2/1984 | Wurzburg et al. . | |
| 4,445,256 | 5/1984 | Huguenin et al. . | |
| 4,455,651 | 6/1984 | Baran | 370/104 |
| 4,456,793 | 6/1984 | Baker et al. . | |
| 4,484,028 | 11/1984 | Kelley et al. . | |
| 4,517,679 | 5/1985 | Clark et al. | 375/37 |
| 4,525,835 | 6/1985 | Vance et al. . | |
| 4,550,414 | 10/1985 | Guinon et al. | 375/1 |
| 4,561,089 | 12/1985 | Rouse et al. . | |
| 4,562,370 | 12/1985 | Von Dach . | |
| 4,563,774 | 1/1986 | Gloge | 455/607 |
| 4,567,588 | 1/1986 | Jerrim . | |
| 4,569,062 | 2/1986 | Dellande et al. . | |
| 4,601,047 | 7/1986 | Horwitz et al. . | |
| 4,606,038 | 8/1986 | Nicolas et al. . | |
| 4,612,637 | 9/1986 | Davis et al. | 370/95 |
| 4,621,365 | 10/1986 | Chiu | 375/1 |
| 4,622,854 | 11/1986 | Locke et al. . | |
| 4,641,317 | 2/1987 | Fullerton | 375/1 |
| 4,642,505 | 2/1987 | Arvanitis . | |
| 4,647,863 | 3/1987 | Skudera et al. . | |
| 4,649,549 | 3/1987 | Halpern et al. | 380/32 |
| 4,653,069 | 3/1987 | Roeder . | |
| 4,660,164 | 4/1987 | Leibowitz . | |
| 4,672,254 | 6/1987 | Dolat et al. . | |
| 4,672,658 | 6/1987 | Kavehjrad et al. . | |
| 4,680,785 | 7/1987 | Akiyama et al. . | |
| 4,691,326 | 9/1987 | Tsuchiya | 375/1 |
| 4,701,904 | 10/1987 | Darcie . | |
| 4,703,474 | 10/1987 | Foschini et al. . | |
| 4,707,839 | 11/1987 | Andren et al. | 375/1 |
| 4,718,080 | 1/1988 | Serrano . | |
| 4,724,435 | 2/1988 | Moses et al. | 375/1 |
| 4,742,512 | 5/1988 | Akashi et al. | 370/96 |
| 4,745,378 | 5/1988 | Niitsuma et al. . | |
| 4,754,453 | 6/1988 | Eizenhofer | 370/95 |
| 4,754,473 | 6/1988 | Edwards . | |
| 4,759,034 | 7/1988 | Nagazumi | 375/1 |
| 4,759,078 | 7/1988 | Schiller . | |
| 4,769,812 | 9/1988 | Shimizu . | |
| 4,774,715 | 9/1988 | Messenger | 375/1 |
| 4,787,093 | 11/1988 | Rorden | 375/23 |
| 4,800,885 | 1/1989 | Johnson | 128/633 |
| 4,804,938 | 2/1989 | Rouse et al. | 340/310 |
| 4,805,208 | 2/1989 | Schwartz . | |
| 4,807,222 | 2/1989 | Amitay . | |
| 4,813,057 | 3/1989 | Fullerton | 375/37 |
| 4,815,106 | 3/1989 | Propp et al. . | |
| 4,833,702 | 5/1989 | Shitara et al. . | |
| 4,837,786 | 6/1989 | Gurantz et al. | 370/20 |
| 4,837,802 | 6/1989 | Higashiyama et al. . | |
| 4,860,307 | 8/1989 | Nakayama | 375/1 |
| 4,866,732 | 9/1989 | Carey et al. | 375/1 |
| 4,878,238 | 10/1989 | Rash et al. | 375/1 |
| 4,893,327 | 1/1990 | Stern et al. | 379/59 |
| 4,894,842 | 1/1990 | Broekhaven et al. | 375/1 |
| 4,901,307 | 2/1990 | Gilhousen et al. | 370/18 |
| 4,905,221 | 2/1990 | Ichiyoshi | 375/1 |
| 4,918,689 | 4/1990 | Hui | 370/85 |
| 4,943,973 | 7/1990 | Werner | 375/1 |
| 4,965,759 | 10/1990 | Uchida et al. | 375/1 |
| 4,979,186 | 12/1990 | Fullerton | 375/23 |
| 4,984,247 | 1/1991 | Kaufmann et al. | 375/1 |
| 4,995,083 | 2/1991 | Baker et al. | 380/23 |
| 5,005,183 | 4/1991 | Carey et al. | 375/1 |
| 5,008,953 | 4/1991 | Dahlin et al. | 375/33 |
| 5,016,255 | 5/1991 | Dixon et al. | 375/1 |
| 5,018,165 | 2/1991 | Sohner et al. | 375/1 |
| 5,022,046 | 6/1991 | Morrow, Jr. | 375/1 |
| 5,022,047 | 6/1991 | Dixon et al. | 375/1 |
| 5,023,887 | 6/1991 | Takeuchi et al. | 375/1 |
| 5,025,452 | 6/1991 | Sohner et al. | 375/1 |
| 5,042,050 | 8/1991 | Owen | 375/1 |
| 5,056,109 | 10/1991 | Gilhousen et al. | 375/1 |
| 5,073,899 | 12/1991 | Collier et al. | 375/1 |
| 5,073,900 | 12/1991 | Mallickrodt | 375/1 |
| 5,101,501 | 3/1992 | Gilhousen et al. | 455/33 |
| 5,109,390 | 4/1992 | Gilhousen et al. | 375/1 |

DUAL MODE TRANSMITTER AND RECEIVER

This is a continuation of co-pending application Ser. No. 07/698,694, filed on May 13, 1991, and which designated the United States, now abandoned.

BACKGROUND OF THE INVENTION

This invention relates to a dual mode cordless telephone where the first mode operates in a frequency division multiplexed narrowband or spread spectrum cellular operation, and the second mode operates in a frequency division multiplexed narrowband or spread spectrum microcellular operation.

DESCRIPTION OF THE RELATED ART

Cellular telephony has been well known for many years, but with its growing popularity, more channels in the allocated cellular frequencies have become necessary. Among the proposed advances in the art have been a move from analog voice, frequency division multiplexed systems to digital voice using traditional narrowband frequency division multiplexed techniques coupled with time division multiplexing. Further proposed advances include the addition of code division multiplexing, or spread spectrum, systems.

An alternate approach to the problem of allowing increased numbers of users in a geographic location is the concept of personal communications systems, or PCN's which utilize microcells. A microcell is similar to a cell in a traditional cellular system, except much smaller. Where a traditional cell may cover an area of several square miles, a microcell may only be a few hundred feet in diameter. By limiting transmit power, more microcells, and thus more users, may be co-located in a geographic area.

Prior art does not teach a method for operation of a single telephone which has the ability to function both as a narrowband frequency, time, and/or code division multiplexed cellular phone, as well as a microcellular telephone utilizing time, frequency, or code division multiplexing, where the cellular and microcellular functions either share the same frequency bands of operation or are offset from each other, and where the microcellular mode may employ a paging unit independent of the unit's telephone functionality.

For purposes of this text, "analog voice" is described as a system where an analog voice system directly modulates a radio frequency (RF) carrier or intermediate frequency (IF) signal, and digital voice is described as a system where the signal is first digitized, and possibly compressed through any number of methods common and well known in the art, and whose digital signal is then used for RF carrier or IF modulation. A narrow band modulation typically uses amplitude modulation (AM) or frequency modulation (FM), and has a bandwidth between 3 kHz and 30 kHz. A spread spectrum signal has a bandwidth several times that of the information signal.

OBJECTS OF THE INVENTION

An object of the invention is to provide an analog voice narrowband frequency division multiplexed cellular telephone which may have capabilities for digital voice as well as frequency and time division multiplexing, and which also may posses spread spectrum microcellular functionality, where the microcellular spread spectrum mode may employ time or frequency division multiple access or both, where the cellular and microcellular modes occupy common or distinct, offset frequency bands, and where the microcellular mode may employ a paging unit independent of the unit's telephone functionality.

SUMMARY OF THE INVENTION

According to the present invention, as embodied and broadly described herein, a dual-mode transmitter is provided comprising an antenna, a mode controller, a mode select switch, information processing means, a tunable-frequency synthesizer, a chip-code generator, a spread-spectrum modulator, a narrowband modulator, a dual-band power amplifier where the dual modes occupy distinct frequency bands, or a single band power amplifier where the dual modes occupy single, contiguous, or closely placed distinct bands, and an adjustable bandpass filter. Narrowband or spread-spectrum modulation is selected using the mode controller. The information processing means processes an information signal for the spread-spectrum modulator or the narrowband modulator. The tunable-frequency synthesizer and the chip-code generator generate a carrier signal and a chip-code signal, respectively. The spread-spectrum modulator modulates the carrier signal with the processed-information signal and the chip-code signal as a spread-spectrum signal, when the mode controller is set to spread-spectrum modulation. The narrowband modulator modulates the carrier with the processed information signal when the mode controller is set to narrowband modulation. With a narrowband modulation setting of the mode controller, the power amplifier may have a narrow bandwidth for amplifying the narrowband modulated signal. With a spread-spectrum setting of the mode controller, the power amplifier may have a wide bandwidth for amplifying the spread-spectrum signal. Similarly, with a narrowband modulation setting of the mode controller, the adjustable bandpass filter has a bandwidth adjusted to a narrow bandwidth for passing the narrowband modulated signal. With a spread-spectrum setting of the mode controller, the adjustable bandpass filter has a bandwidth adjusted to a wide bandwidth for passing the spread-spectrum signal. The adjustable bandpass filter may also be tuned, and the power amplifier switched, where distinct, offset frequencies are employed for the two operating modes.

The present invention also includes a dual-mode receiver. The dual-mode receiver includes a mode controller, a mode select switch, a tunable-frequency synthesizer, a chip-code generator, an antenna, a tunable bandpass filter, a preamplifier, a frequency converter, an IF amplifier, a spread-spectrum despreader, a spread-spectrum demodulator, a narrowband demodulator, and information processing means. As with the dual-mode transmitter, the mode controller is used to select reception of a narrowband or spread-spectrum signal. The tunable-frequency synthesizer generates a local oscillator signal. The chip-code generator provides a reference chip-code signal for comparison with the received spread spectrum signal. With a narrowband modulation setting of the mode controller, the adjustable bandpass filter may be adjusted to a narrow bandwidth for passing the narrowband modulated signal. With a spread-spectrum setting of the mode controller, the adjustable bandpass filter may be adjusted to a wide bandwidth for passing the spread-spectrum signal. The bandpass filter also is tunable, where different frequencies are utilized for distinct modes.

The preamplifier amplifies the filtered narrowband modulated signal when the mode controller is set to the narrowband modulation setting. The preamplifier amplifies the filtered spread-spectrum signal when the mode controller is set to the spread-spectrum modulation setting. The preamplifier may also be switch selected or tuned to the appropriate band where the dual modes employ distinct, separated frequency bands. The frequency converter converts, using the local oscillator signal provided by the synthesizer, the filtered narrowband modulated signal or the filtered spread-spectrum signal to an IF signal. The spread-spectrum despreader despreads, using the chip-code reference signal, the IF signal as a processed signal. The spread-spectrum demodulator demodulates the processed signal as a demodulated signal.

The narrowband demodulator demodulates the filtered narrowband modulated signal as a demodulated or processed signal. The information means processes the demodulated signal from either the spread-spectrum demodulator or the narrowband demodulator as an information signal, as necessary.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
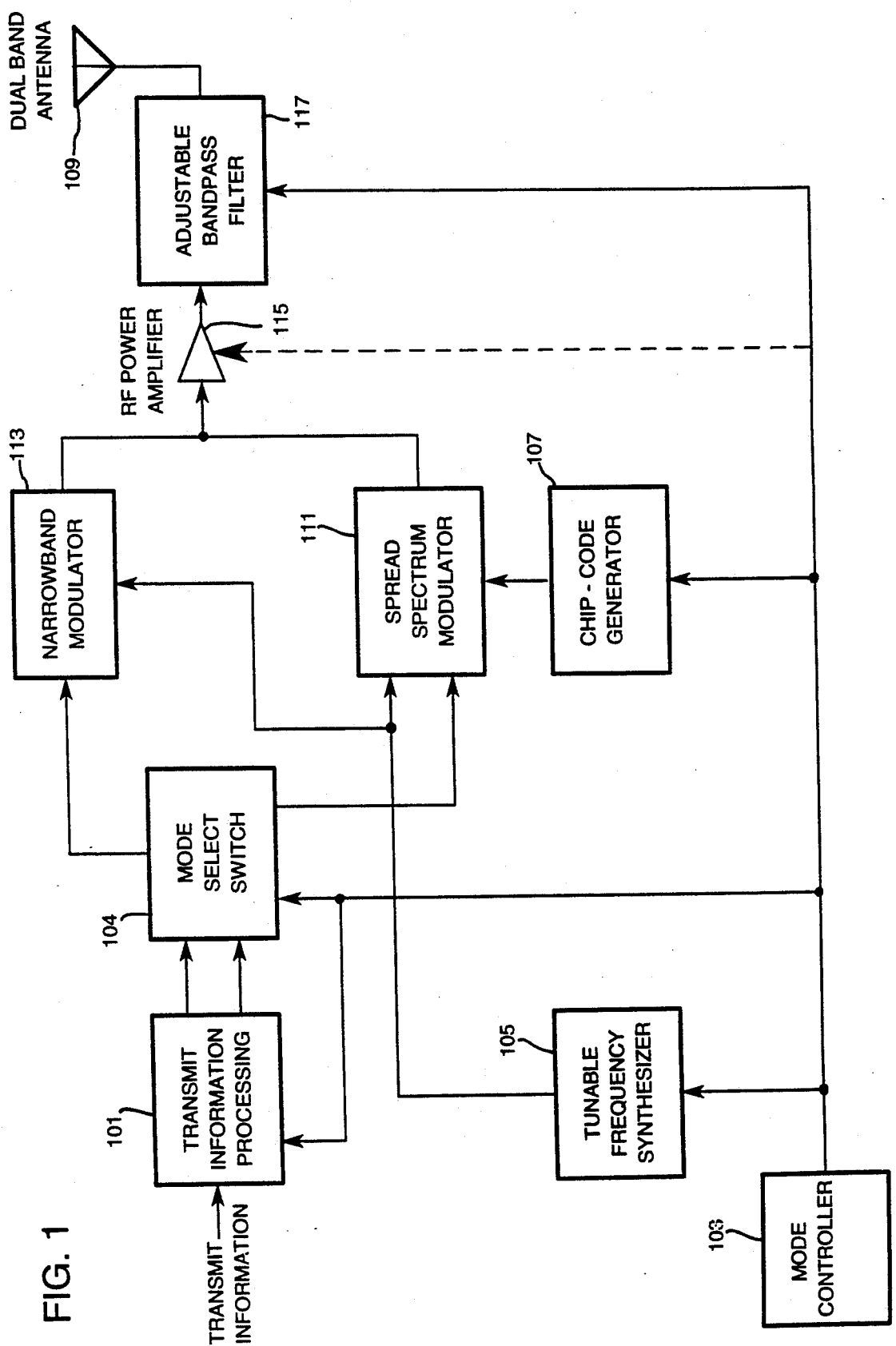
FIG. 1 shows a dual-mode transmitter block diagram according to the present invention.

Reference will now be made in detail to the present preferred embodiments of the invention, examples of which are illustrated in the accompanying drawings, wherein like reference numerals indicate like elements throughout the several views.

Modern and proposed cellular telephone systems currently utilize high power, frequency, time, and/or code division multiplexed narrowband radio frequency communication techniques in conjunction with large cells to establish and maintain telephone communications. With the growing popularity of these systems, increased user capacity is required within a geographical area. One approach to providing increased capacity is microcells, which utilize comparatively much smaller cells, and low power radio frequency techniques.

Traditional cellular systems have proven to be highly capital intensive in base station installations, on the order of several hundred thousand dollars per cell site, and therefore demand high operational and access fees. Proposed microcell systems would require a much lower capital investment per cell at a small fraction of cellular site installation, such that shop owners and other small operators could have a cell site easily installed on their premises. Microcells potentially may be located in public access areas, airports, restaurants, shopping malls, banks, service stations, etc., as well as commercial or office facilities, utilizing wireless PBX, centrex, or key systems, and residential sites. A microcell user, thus, could utilize his handset at home, in the office, or at most other public places where he typically would need access to telephone communications, in a cost effective way, and maintain a single telephone number. Public operational and access charges to the user could then be much lower, likely on the order of payphone charges per call, not per minute.

A disadvantage of microcellular systems is their potential lack of incoming call accessibility. Potentially, one cannot place a call into the system to the remote user. Studies have been performed, however, that estimate that up to 80% of all calls made in traditional cellular systems are from the user outbound from the microcell user, and not inbound to the user. Even with no inbound access to the wireless microcell user, a potentially large market exists which has little need for incoming access, where users would be willing to surrender incoming call access for the savings of a microcellular pager in the microcell handheld unit, which can provide for a level of incoming access to the user in the public environment.

Another disadvantage is practical handoff capabilities from cell to cell. Since the cells in a microcell system are small, the system becomes impractical to use from a moving vehicle since the user potentially could be passing through cells every few seconds, which make handoffs impractical. Microcellular systems may be designed such that there is no handoff capability between cells, which would provide for a wireless payphone type of system. Since microcells are so small, system use in remote areas would be impractical due to the number of cell installations necessary to provide complete coverage.

The present invention provides a dual-mode transmitter and receiver which provides for utilization of the advantages of both systems, i.e. the range and mobility of traditional cellular, and the low cost of microcellular. The dual-mode transmitter and receiver include a dual mode cordless telephone which has as its first mode operational capabilities which allow cellular functionality, and a second mode which allows for microcellular operation. Functionality in the first, or cellular, mode includes a relatively high power cellular telephone employing analog or digital voice techniques in conjunction with frequency, and/or time division traditional narrowband radio techniques. Functionality in the second, or microcellular, mode includes a low power microcellular telephone using digital voice techniques in conjunction with frequency, time and/or code division spread spectrum radio techniques, where the cellular and microcellular functions either share the same frequency bands, or are offset from each other.

In the exemplary arrangement shown in FIG. 1, a dual-mode transmitter of the present invention is shown comprising an antenna 109, a mode controller 103, a mode select switch 104, transmitter-information processing means 101, a tunable-frequency synthesizer 105, a chip-code generator 107, a spread-spectrum modulator 111, a narrowband modulator 113, a power amplifier 115, and an adjustable bandpass filter 117. The transmitter-information means may be embodied as an information device 101. The information device may include source encoders such as Golay encoders, error correction coding, analog-to-digital converters, etc.

The spread-spectrum modulator 111 is coupled to the information device 101 through mode select switch 104, the tunable-frequency synthesizer 105 and the chip-code generator 107. The narrowband modulator 113 is coupled to the information device 101 through mode select switch 104, and the tunable-frequency synthesizer 105. The power amplifier 115 is coupled to the mode controller 103, the spread-spectrum modulator 111 and the narrowband modulator 113. The adjustable, tunable, bandpass filter 117 is coupled to the antenna 109, the power amplifier 115 and the mode controller 103.

Narrowband or spread-spectrum modulation is selected using the mode controller 103. The information device 101 processes the input information signal, while the tunable-frequency synthesizer 105 generates a carrier signal, and the chip-code generator 107 generates a chip-code signal.

The mode controller 103 controls a mode select switch 104 which directs the processed information signal to the narrowband modulator 113 or the spread-spectrum modulator 111. The spread-spectrum modulator 111 modulates the carrier with the processed information signal and the chip-code signal as a spread-spectrum signal, when the mode select switch 104 has been selected for spread-spectrum modulation. The narrowband modulator 113 modulates the carrier with the processed information signal as a narrowband modulated signal, when the mode select switch 104 is selected for narrowband modulation.

When the mode controller 103 is set to narrowband modulation, the power amplifier 115 amplifies the narrowband modulated signal. Where the dual modes function in distinct frequency bands, the power amplifier 115 may either be wideband enough to function in both bands, or may be adjustable to function in the band pertaining to the mode in operation, with mode controller 103 controlling its operation accordingly. When the mode controller 103 is set to spread-spectrum modulation, the power amplifier 115 amplifies the spread-spectrum signal. Similarly, with a narrowband modulation setting of the mode controller 103, the adjustable bandpass filter 117 has a bandwidth adjusted to a narrow bandwidth and corresponding frequency for passing the narrowband modulated signal. With a spread-spectrum setting of the mode controller 103, the adjustable bandpass filter 117 has a bandwidth adjusted to a wide bandwidth and corresponding frequency for passing the spread-spectrum signal.

Figure 2:
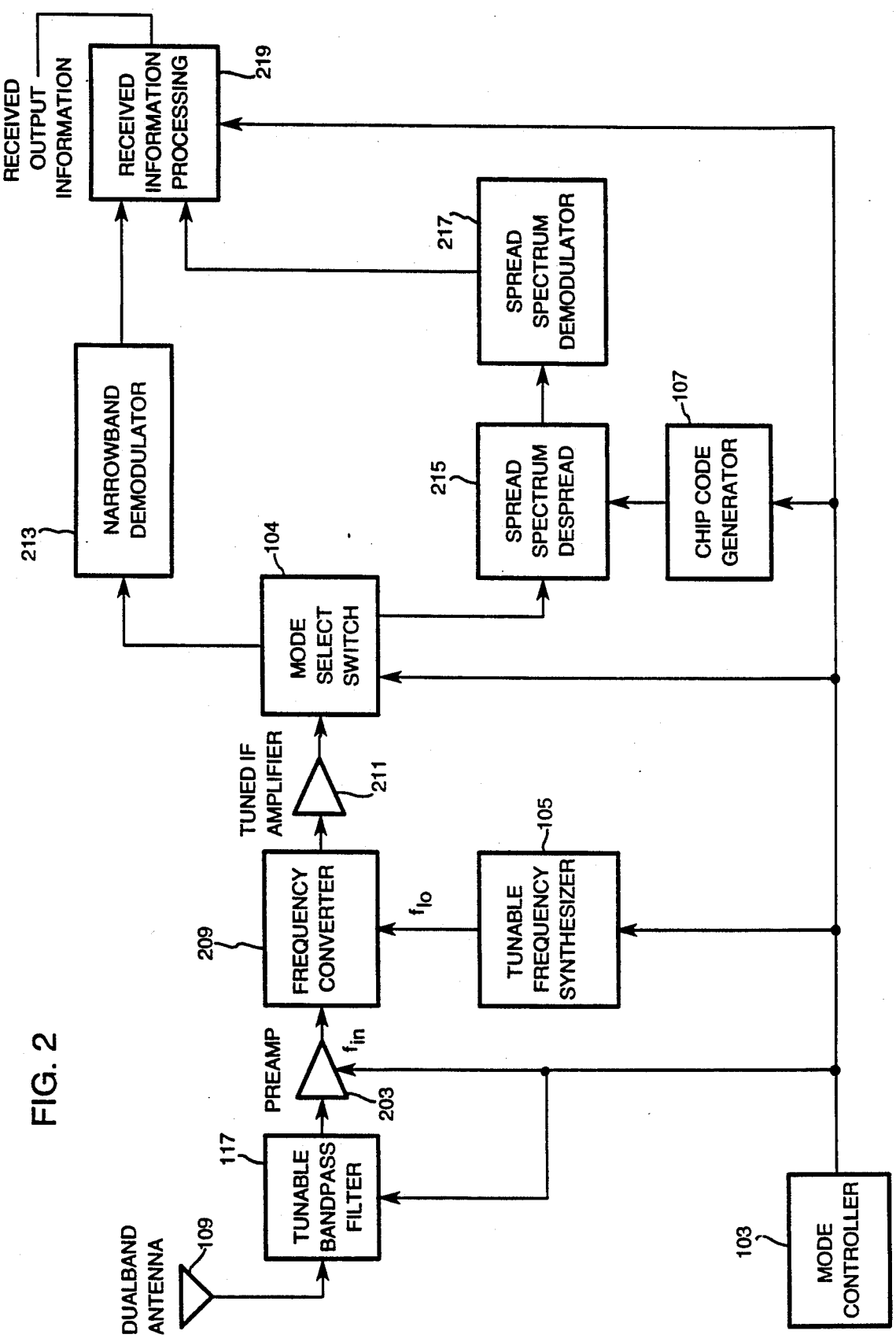
FIG. 2 shows a dual-mode receiver block diagram according to the present invention.

The present invention, as illustrated in FIG. 2, also includes a dual-mode receiver. The dual-mode receiver includes a mode controller 103, a tunable-frequency synthesizer 105, a chip-code generator 107, an antenna 109, an adjustable bandpass filter 117, a preamplifier 205, a frequency converter 209, an IF amplifier 211, a mode select switch 104, a spread-spectrum despreader 215, a spread-spectrum demodulator 217, a narrowband demodulator 213, and receiver-information processing means. The receiver-information means is embodied as a receiver-information processing device 219. The adjustable bandpass filter 117, is coupled to the antenna 201 and to the mode controller 103. The preamplifier 205 is coupled to the adjustable bandpass filter 117 and to the mode controller 103. The frequency converter 209 is coupled to the preamplifier 205 and the tunable-frequency synthesizer 105. The IF amplifier 211 is coupled to the frequency converter 209. The spread-spectrum despreader 215 is coupled to the chip-code generator 107 and through the mode select switch 104 to the IF amplifier 211. The spread-spectrum demodulator 217 is coupled to the spread-spectrum despreader 215. The narrowband demodulator 213 is coupled through the mode controller 103 to the IF amplifier 211.

As with the dual-mode transmitter, the mode controller 103 is used to select reception of narrowband or spread-spectrum modulation. The tunable-frequency synthesizer 105 generates a local oscillator signal, and the chip-code generator 107 generates a reference chip-code signal for comparison with the received chip code signal.

When the mode controller 103 is set to narrowband modulation, the adjustable bandpass filter 117 is adjusted to a narrow bandwidth and corresponding frequency for passing the narrowband modulated signal. With a spread-spectrum setting of the mode controller 103, the adjustable bandpass filter 117 is adjusted to a wide bandwidth and corresponding frequency for passing the spread-spectrum signal. The preamplifier 205 amplifies the filtered narrowband modulated signal when the mode controller 103 is set to the narrowband modulation setting, and amplifies the filtered spread-spectrum signal when the mode controller is set to the spread-spectrum modulation setting and is switch selectable to the appropriate band for each mode where the dual modes occupy non-contiguous or widely separated frequency bands. The frequency converter 209 converts using the local oscillator signal, the filtered narrowband modulated signal and the filtered spread-spectrum signal to an IF signal.

FIGS. 1 and 2 illustrate the implementation of a dual mode transmitter and receiver, respectively, for use in any conventional narrowband application with capability to switch to a separate frequency band while employing spread spectrum modulation/demodulation in the alternate operating band.

Operation of the dual-band transmitter is as follows. Using transmitter-information processing device 101, input information may be filtered, analog-to-digital (A/D) converted if required, as determined by the mode switch control, and applied to either a narrowband or spread spectrum modulation process. Narrowband modulation is employed in conventional communication and the spread spectrum modulation employed in a spread-spectrum mode. In either mode, the modulated carrier is applied to the dual band RF power amplifier 115.

The tunable frequency synthesizer 105, which provides the proper carrier for either conventional narrowband or spread spectrum mode, is controlled by the mode switch controller 103, outputting only one of possibly many required transmit carrier frequencies for modulation at any one time.

After amplification, the proper modulated carrier signal, either conventional narrowband or spread spectrum, is applied to an adjustable, tunable bandpass filter 117 and then to the antenna 109. The pass band and frequency of the adjustable bandpass filter 117 is selected by the mode controller 103. This is necessary to meet transmission spurious signal level control standards.

A single, dual band antenna 109 then acts as a transducer to convert the electrical RF signal from the power amplifier 115 and adjustable bandpass filter 117 to an electromagnetic signal for propagation to the receiver.

The mode controller 103 also controls the operation of a reference code generated by chip-code generator 107. The reference code is used as a spectrum-spreading function in the spread spectrum mode. The chip-code generator 107 would not operate in the conventional narrowband mode.

This transmitter configuration is applicable to any desired dual mode system in which one mode is used in a conventional narrowband system, such as cellular telephones, while a second mode is employed for communicating with a spread spectrum system.

Receiver operation is as follows. A received signal is converted by the antenna 109 from an electromagnetic signal to an electrical signal. The antenna 109 may or may not be common to the transmitter. The received signal is then applied to an adjustable bandpass filter 117, which may or may not be common to the transmitter, and which is controlled by the mode controller 103. The adjustable bandpass filter 203 selects the proper conventional narrowband or spread spectrum operating signal and passes it through a preamplifier 205, whose output is applied to a frequency converter 209.

The other input to the frequency converter 209 is a local oscillator signal generated by a tunable frequency synthesizer 105 whose frequency in turn is controlled by the mode controller 103. The input signal is converted to an intermediate frequency (IF), which may be the same for either conventional narrowband or for spread spectrum signals. The receiver is assumed to be the superheterodyne type, and is illustrated as a single conversion receiver, but may also be implemented by a dual or multi-conversion superheterodyne receiver without a change in the overall system's operation.

An output signal from the frequency synthesizer 105 is multiplied with the amplified input signal from the preamplifier 205 selected by the input filter, in frequency converter 209 to produce the intermediate frequency signal. A tuned, fixed-frequency IF amplifier 211 amplifies the received signal and applies it to a mode select switch 104 whose output goes to either the conventional narrowband signal demodulator 213 or the spread-spectrum signal despreader 215. The despreader 215 uses a reference code provided by the chip-code generator 107 to facilitate proper spread spectrum signal selection and despreading. This reference code is controlled by the mode controller 103, and may be common to the transmitter shown in FIG. 1.

The spread-spectrum despreader 215 despreads, using the reference chip-code signal, the IF signal as a digitally modulated signal. The spread-spectrum demodulator 217 demodulates the digitally modulated signal as a digitally demodulated signal. The narrowband demodulator 213 demodulates the filtered narrowband modulated signal as a demodulated signal. The receiver-information device 219 signal processes the demodulated signal as an information signal.

Spread spectrum signals, after being despread, are demodulated by a spread-spectrum demodulator 217, separate from the narrowband demodulator 213. This is necessary because of the difference in conventional signal information modulation of the carrier is typically analog FM, while spread spectrum signals may employ digital modulation, which may be digital-to-analog (D/A) converted prior to processing. If the narrowband technique used employs digital modulation, a second narrowband D/A demodulator, similar to the spread spectrum demodulator, may be employed, or the spread spectrum demodulator may be eliminated and D/A demodulation, which may be identical for both narrowband and spread spectrum modulation, may be included as a function of the received information processor.

After despreading, spread-spectrum demodulator 217 output signals are processed, using receiver-information device 219, by filtering, digital-to-analog conversion, and amplification, as necessary, to convert it to a form that is usable to the information output destination. Processing is selected by the mode switch control 103.

As in the transmitter, more than two modes can be supported by this same receiver configuration. This includes operation at multiple frequencies, use of multiple codes, multiple modulation formats, or time-sequential selection of operating mode.

The following illustrate application of the present invention, for particular modulation schemes.

A first embodiment of the invention includes a telephone whose first mode comprises analog voice techniques and traditional cellular frequency division multiplexed operation employing, but not limited to, narrowband radio frequency modulation techniques, such as FM, and whose second mode comprises microcellular operation including, but not limited to, digital voice companding and/or compression techniques coupled with spread spectrum radio frequency modulation, and/or time and/or frequency division multiplexing techniques, where the cellular and microcellular modes occupy common frequency bands. The microcellular mode also may include a paging function, which may utilize narrowband or spread spectrum technologies, and occupy frequency bands common to the cellular and microcellular modes, or may be offset from both or either, and may be independent of the unit's telephone functionality.

A second embodiment of the invention includes a telephone whose first mode comprises cellular frequency division multiplexed operation employing, but not limited to, narrowband radio frequency modulation techniques, such as FM, coupled with digital voice commanding and/or compression and/or time division multiplexing techniques, and whose second mode comprises microcellular operation including, but not limited to, digital voice compendium and/or compression techniques coupled with spread spectrum radio frequency modulation, and/or time and/or frequency division multiplexing techniques, where the cellular and microcellular modes occupy common or distinct frequency bands. The microcellular mode may also include a paging function, which may utilize narrowband or spread spectrum technologies, and may occupy frequency bands common to the cellular and microcellular modes, or may be offset from both or either, and may be independent of the unit's telephone functionality.

It will be apparent to those skilled in the art that various modifications can be made to the dual-mode transmitter and receiver of the instant invention without departing from the scope or spirit of the invention, and it is intended that the present invention cover modifications and variations of the dual-mode transmitter and receiver provided they come within the scope of the appended claims and their equivalents.

We claim:

1. A dual-mode transmitter comprising:
   an antenna;
   a mode controller for selecting narrowband modulation and spread-spectrum modulation;
   information means for processing an information signal;

a tunable-frequency synthesizer for generating a carrier signal;

a chip-code generator for generating a chip-code signal;

a spread-spectrum modulator coupled to said information means, said tunable-frequency synthesizer and said chip-code generator for spread-spectrum modulating the processed information signal with the chip-code signal and the carrier signal as a spread-spectrum signal;

a narrowband modulator coupled to said information means and said tunable-frequency synthesizer for modulating the processed information signal with narrowband modulation as a narrowband modulated signal;

a power amplifier coupled to said mode controller, said spread-spectrum modulator and said narrowband modulator, responsive to a narrowband modulation setting of said mode controller for amplifying the narrowband modulated signal, and responsive to a spread-spectrum setting of said mode controller for amplifying the spread-spectrum signal;

an adjustable bandpass filter coupled to said antenna, said power amplifier and said mode controller, responsive to a narrowband modulation setting of said mode controller for adjusting a bandwidth of said adjustable bandpass filter to a narrow bandwidth for passing the narrowband modulated signal, and responsive to a spread-spectrum setting of said mode controller for adjusting the bandwidth of said adjustable bandpass filter to a wide bandwidth for passing the spread-spectrum signal.

2. The dual-mode transmitter as set forth in claim 1 wherein said mode controller includes a mode switch for selecting the narrowband modulation and the spread-spectrum modulation.

3. The dual-mode transmitter as set forth in claim 1 wherein said narrowband modulator includes an FM modulator modulating the signal-processed information signal with FM modulation.

4. The dual-mode transmitter as set forth in claim 1 wherein said spread-spectrum modulator includes a time division multiplexed modulator.

5. The dual-mode transmitter as set forth in claim 1 wherein said narrowband modulator includes a time division multiplexed modulator.

6. A dual-mode receiver comprising:

a mode controller for selecting a narrowband modulation and a spread-spectrum modulation;

a tunable-frequency synthesizer for generating a local oscillator signal;

a chip-code generator for generating a chip-code signal;

an antenna;

an adjustable bandpass filter coupled to said antenna and said mode controller, responsive to a narrowband modulation setting of said mode controller for adjusting a bandwidth of said adjustable bandpass filter to a narrow bandwidth for passing the narrowband modulated signal, and responsive to a spread-spectrum setting of said mode controller for adjusting the bandwidth of said adjustable bandpass filter to a wide bandwidth for passing the spread-spectrum signal;

a preamplifier coupled to said adjustable bandpass filter and said mode controller, responsive to a narrowband modulation setting of said mode controller for amplifying the filtered narrowband modulated signal, and responsive to a spread-spectrum setting of said mode controller for amplifying the filtered spread-spectrum signal;

a frequency converter coupled to said preamplifier and said tunable-frequency synthesizer, for converting, using the local oscillator signal, the filtered narrowband modulated signal and the filtered spread-spectrum signal to an IF signal;

an IF amplifier coupled to said frequency converter for amplifying the IF signal;

a spread-spectrum despreader coupled to said chip-code generator and through said mode controller to said IF amplifier, responsive to said mode controller selecting the spread-spectrum modulation, for spread-spectrum despreading, using the chip-code signal, the IF signal as a modulated signal;

a spread-spectrum demodulator coupled to said spread-spectrum despreader for demodulating the modulated signal as a demodulated signal;

a narrowband modulator coupled to said chip-code generator and through said mode controller to said IF amplifier, responsive to said mode controller selecting the narrowband modulation for demodulating the filtered narrowband modulated signal as a demodulated signal; and information means coupled to said narrowband demodulator and to said spread-spectrum demodulator for signal processing the demodulated signal as an information signal.

7. The dual-mode receiver as set forth in claim 6 wherein said spread-spectrum despreader includes a surface-acoustic-wave device for despreading the IF signal.

8. The dual-mode receiver as set forth in claim 6 wherein said spread-spectrum demodulator includes an envelope detector for demodulating the modulated signal as a demodulated signal.

* * * * *